Dec. 19, 1972 SHINICHIRO NAGASHIMA ET AL 3,706,551

ELECTROCONDUCTIZED ORGANIC INSULATING MATERIAL

Filed March 26, 1970 2 Sheets-Sheet 1

Dec. 19, 1972 SHINICHIRO NAGASHIMA ET AL 3,706,551

ELECTROCONDUCTIZED ORGANIC INSULATING MATERIAL

Filed March 26. 1970 2 Sheets-Sheet 2

3,706,551

ELECTROCONDUCTIZED ORGANIC INSULATING MATERIAL

Shinichiro Nagashima and Kaichi Tsuchiya, Tokyo, Japan, assignors to Canon Kabushiki Kaisha, Tokyo, Japan Filed Mar. 26, 1970, Ser. No. 22,789
Claims priority, application Japan, Mar. 27, 1969, 44/23,365; Mar. 28, 1969, 44/23,616, 44/23,617; Apr. 1, 1969, 44/24,686
Int. Cl. G03g 5/09
U.S. Cl. 96—1.5 3 Claims

ABSTRACT OF THE DISCLOSURE

An organic insulating material, e.g. film, is exposed to a radiation of a wave length below 4000 A. to impart an increased electroconductivity to the surface. The resulting organic insulating material having the electrostatically electroconductized layer is useful for preparing a photosensitive member suitable for electrophotography.

This invention relates to an electroconductized organic insulating material, and more particularly, to an organic insulating material electrostatically electroconductized by an electroconductizing method. Further, this invention relates to an electrophotographic photosensitive material utilizing the electroconductized organic insulating material.

By "electroconductizing" is meant to impart an increased electroconductivity to a material such as in antistatic treatment.

In general, organic substances having high electric resistance such as synthetic resin and synthetic fiber have a property of being charged by friction and thereby, sometimes electric shock and discharging occur during handling and further a fire breaks out. For the purpose of eliminating such defects, the surface of organic products are often treated with antistatic agents. However, antistatic agents are hydrophilic while organic products are hydrophobic. Therefore, the coated antistatic agent is removed from the surface during handling, for example, by rubbing while using for a long period of time and thereby the antistatic effect is reduced.

This invention provides a novel method which can solve the above-mentioned defects in conventional antistatic treatment. The essential feature of this invention is to modify photochemically the surface of organic products.

In other words, this invention offers an electroconductizing treatment method characterized by irradiating at least one surface of organic substance product having a high electric resistance with radiation having a wavelength below 4000 A. to cause photochemical change to take place at the irradiated surface and convert the irradiated surface to a surface having a low electric resistance, and offers an organic insulating material having a surface that has undergone electroconductizing treatment.

This invention is based on the knowledge of the inventor that when a material consisting of organic substances is irradiated with a radiation having a wavelength below 4000 A., it is degradated photochemically and a material which is essentially electrically insulating or hydrophobic is converted to an electrically conductive or hydrophilic material.

However, the mechanism through which an insulating or hydrophobic organic material is converted to an electrically conductive or hydrophilic is not clearly known at present. It is considered that a part of organic substance may be decomposed, disintegrated, or degradated by the surface absorption of the above-mentioned radiation.

In this invention, it is desired that the above-mentioned radiation is applied, to a degree only sufficient to provide the organic substance with electric conductivity so as to prevent charging or damage. In other words, application of radiation having an intense energy to an organic substance over a long period of time may deteriorate the entire substance and impair the properties inherent to the substance by reducing its mechanical strength or discoloring it.

Prevention of charging or providing surface conductivity is a problem concerned only with the surface of a substance. Therefore, in this invention, it is sufficient only to effect modification of the surface of the organic substance by light, and it is rather convenient to limit the modification only to the surface layer since the properties inherent to the substance are not disadvantageously affected.

Although the appropriate irradiating conditions in this invention is determined by first considering the interrelationship among the degree of absorption of the selected radiation or its energy by the organic substance, intensity of the radiation, irradiating period, and degree of charge prevention after treatment, and then conducting preliminary experiments, a good result can generally be obtained by using radiations having wavelengths ranging from 1000 A. to 3000 A.

Organic substances to which the electroconductizing processing method according to this invention is applicable are generally the substances known to have a high electric resistance. Examples are such organic insulating materials, for example, thermoplastic resins such as polymers and copolymers of vinyl compounds represented by vinylchloride, propylene, vinylacetate, styrene, acryl compound, ethylene, etc., thermosetting or thermoplastic resins represented by condensation reaction products between phenol and formaldehyde, melamine and formaldehyde, urea and formaldehyde, epichlorohydrin and bisphenol, isocyanate compounds and diamines or dicarboxylic acids or polyhydric alcohols, polybasic acids and polyhydric alcohols, and phosgene and dihydroxy compounds, cellulose derivatives such as cellulose acetate, and nitrocellulose, natural substances such as rosin, copal, rubber, and wax, mixtures and derivatives of above-mentioned substances. Radiation is applied to the solid substances in film form, fiber form, or plasticized form and composed of above-mentioned electrically insulating materials.

Furthermore, according to this invention, an antistatic agent or electroconductizing agent is applied to the surface of an organic substance that has undergone irradiation with radiation. According to the knowledge of the inventor, a surface that has undergone irradiation with radiation like the invented one is generally very active to antistatic agents or electroconductizing agents, and it has been found that an excellently close contact between these agents and the surface is obtained when the agents are coated on said surface.

As the antistatic agents or electroconductizing agents in this invention, various well-known substances may be used. Examples thereof are: water soluble resins of vinyl series such as copolymer of acrylic acid and acrylic ester, copolymer of vinyl acetate and crotonic acid, copolymer of styrene and maleic acid; polyacrylic acid, polyacrylic amide, polyethylene imine, polyvinyl alcohol, and polyvinyl pyrrolidone; water soluble cellulose derivatives such as carboxymethylcellulose, methyl or ethyl cellulose; animal and vegetable proteins such as gelatin and casein; vegetable mucilages such as gum arabic and sodium alginate; polyhydric alcohols such as ethylene glycol, glycerol, and sorbit; inorganic salts such as sodium chloride, ammonium chloride, potassium chloride, calcium chloride, and sodium nitrate; various kinds of surface active agents; and polymers of quaternary ammonium salts such as poly-(N,N-dimethyl-3,5-methylene) piperidinium chloride and polyvinyl benzyltrimethyl ammonium chloride. These are used either singly or in mixture of two or more than two kinds of substances.

The electroconductizing technique according to this invention mentioned above is applicable to electroconductizing various kinds of organic substances. The cases in which this technique is specifically applied to electrophotography will be described in the following.

Up to the present, photoconductive materials employed in electrophotographic technique generally have comprised a base made of paper or film and a photoconductive layer laid thereon. Such a photosensitive layer is generally required to have high dark resistance and photoconductivity and the base film is required to have an electroconductivity sufficient to eliminate the electrostatic charge and must in general have an electric resistance below $10^{10}\ \Omega$ cm.

To meet these requirements, the base usually undergoes priming by an electroconductizing layer and the photoconductive is laid upon it.

On the other hand, there is known a so-called self-supporting type photoconductive film which needs not to employ a base such as paper or film at all. In this case, if the film is placed on an earth electrode at time of charging exposure, the film is supposed to fully display its characteristic as photographic material without having a coating of electroconductive layer on one surface of the film. Actually, however, irregularity in the image may be produced at a place where the film floats on the earth electrode, and it is difficult to obtain a good quality print. Furthermore, if the film is dipped into a liquid developer, reversed images disadvantageously appear on the back surface of the film. Therefore, in order to obtain an excellent image, it is necessary to provide an electroconductive layer on at least one of the film surfaces.

Difficulties have been often encountered in the coating technique when applying an electroconductive layer to the base. One of the difficulties is that uniform coating of generally hydrophilic electroconductizing agents is not possible when the base is hydrophobic and, as the result, irregularity in coating is caused by rejection of coating. This makes a uniform coating hard to obtain.

Another difficulty is that the electroconductive layer coated is easily peeled off from the base for reason of hydrophobic and hydrophilic properties and has a bad contact with the base.

Other known methods to obtain photoconductive photosensitive materials suitable for photographic reproduction are the one in which a photoconductive layer is provided in a dot form on the base like the meshdot, the one in which a substance having a low electric resistance is coated on the surface of photosensitive material comprising a uniform photoconductive layer laid on the base in a dotmesh form, or the one in which a highly electric resistant substance is provided in meshdot-form between the base and the photoconductive layer, etc.

These methods are contemplated to obtain a good photographic reproduction by preventing the edge effect from occurring by making the charge on the surface of photosensitive material disperse unevenly at time of charging or exposure.

However, it is unexpectedly troublesome to provide the photosensitive layer in dotform or to coat a low resistance substance on the surface discontinuously and such procedures require special facilities such as gravure coating. The substance that has been coated on the front or back surface affects the photoconductive layer during storing to deteriorate the sensitivity and performance. Furthermore, when the photoconductive layer is hydrophobic like an organic photoconductive body, it is technically very difficult to provide on it a low resistant substance which is hydrophilic and, even if the low resistant substance is provided on the photoconductive layer, the low resistant substance is not persistently adhered and is easily peeled off. The defects as mentioned above of the conventional methods can be eliminated by the present invention.

An object of this invention is to offer an organic insulating substance having a surface electrostatically electroconductized by modifying the surface photochemically.

A further object of this invention is to offer an organic insulating substance having a surface electroconductized by establishing an electroconductizing layer further on the surface of the organic substance that has been modified photochemically.

Another object of this invention is to offer a stable and inexpensive photosensitive material by using each electroconductizing technique mentioned above to solve the various defects involved in conventional electroconductizing methods.

A still further object of this invention is to offer a photosensitive material particularly suited for photographic reproduction and a method for producing said photosensitive material without using at all a special coating machine and substance capable of causing unfavorable effect on the characteristic of the photoconductive layer.

This invention resides in the electroconductizing method characterized by irradiating at least one surface of organic substance product having a high electric resistance with radiations having wavelengths below 4000 A., by causing photochemical change to occur in the irradiated surface, and by converting the irradiated surface into a surface having a low electric resistance, and in an organic insulating substance that has been electroconductized by said method.

Furthermore, this invention resides in an organic insulating substance that has been electroconductized by establishing a electroconductizing agent layer further on the organic substance that has been photochemically modified by the irradiation of a radiation below 4000 A.

Furthermore, this invention lies in an electrophotographic photosensitive member formed by irradiating at least one surface of the base consisting of organic substance with a radiation having a wavelength below 4000 A., by forming a low resistant layer which has been changed photochemically, on the surface of the base, and if necessary, further by forming a layer of electroconductizing agent thereon, and by forming a layer of photoconductive substance thereon.

Furthermore, this invention lies in a photoconductive photosensitive material formed by using a photoconductive substance as the main body, adding a film forming agent thereto if required, irradiating the photoconductive photosensitive layer thus formed with a radiation having a wavelength below 4000 A., and either establishing or not establishing a layer of electroconductizing agent on the irradiate surface obtained.

Furthermore, this invention resides in a photoconductive photosensitive material having a pattern irradiated layer made by irradiation with a radiation having a wavelength below 4000 A. on at least one surface thereof.

This invention will be described more in detail, referring to the accompanying drawings, in which.

Figure 1:
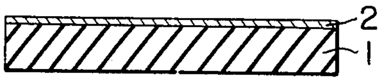
FIGS. 1 through 6 and FIG. 9 show the constitution diagrams of the embodiments of this invention.
Figure 2:
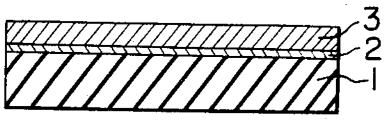

FIGS. 1 and 2 are the configuration of basic examples of this invention. FIG. 1 shows an example, in which one surface of the insulating film 1 is provided with a radiation irradiated portion 2. FIG. 2 shows an example having a layer 3 of electroconductizing agent further on the radiation irradiated portion 2 of FIG. 1.

Figure 3:
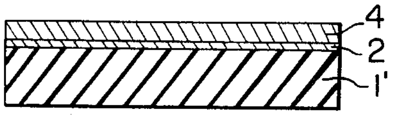
Figure 4:
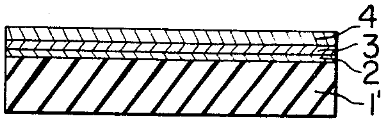

FIGS. 3 through 6 show examples of the configuration of the invented photosensitive material. FIG. 3 is an example comprising the base 1' consisting mainly of organic insulating film, the electroconductive layer 2 formed by irradiating said base with radiation, and the photoconductive layer 4 provided on the base in contact with said electroconductive layer 2. The photosensitive material shown in FIG. 4 comprises basically the base 1', the electroconductive layer 2 formed by irradiating said base 1' with radiation, the electroconductizing agent layer 3 laid on the electroconductive layer 2, and the photoconductive layer 4 laid on the electroconductizing agent layer 3.

Figure 5:
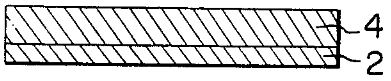

FIG. 5 shows an example having the radiation irradiated portion 2 on one surface of the photoconductive photosensitive layer 4.

Figure 6:
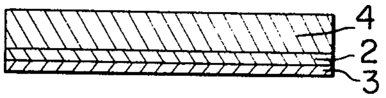

FIG. 6 is an example of photoconductive photosensitive material in which the electroconductizing agent layer 3 is laid on the radiation irradiated surface 2 of FIG. 5.

Figure 7:
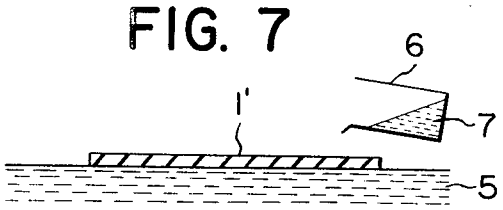
FIGS. 7 and 8 show the method for making photosensitive material having pattern irradiated layer of radiation.
Figure 8:
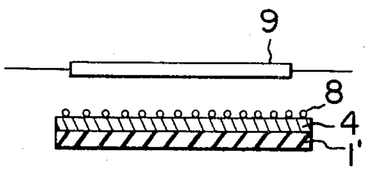
Figure 9:

FIGS. 7 and 8 show the method for manufacturing the invented photosensitive material having a pattern form radiation irradiated layer, in which 1' shows the base supported horizontally on the mercury layer 5, and 6 the container containing the photoconductive resin 7 in it. The photosensitive layer 4 (FIG. 8) is formed by running the photoconductive resin 7 on the surface of the above-mentioned base 1'. Next, as shown in FIG. 8, by way of mesh dot metal mesh 8 or by way of solid or liquid grains scattered on the surface of the photosensitive layer or by way of a quartz plate having a pattern of optional form constructed with a substance that does not pass a radiation of wavelength below 4000 A., a radiation having a wavelength below 4000 A. is applied to the photosensitive layer 4 from the light source 9 to form a photochemically changed electroconductive pattern 10 on the photosensitive layer 4 as shown in FIG. 9. In this way a photosensitive material is obtained.

Figure 10:
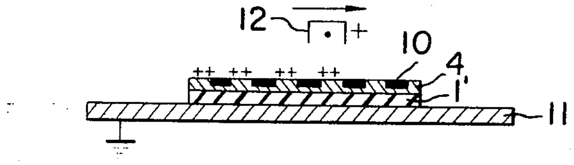
FIGS. 10 through 12 show an example of image forming process using a photosensitive material having a pattern irradiated layer by radiation.
Figure 11:
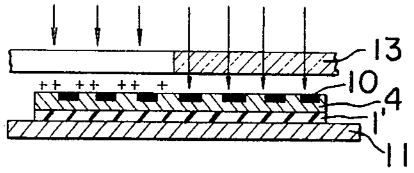
Figure 12:
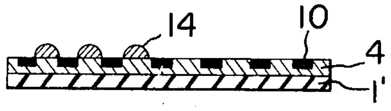

To form an image on the above-mentioned photosensitive material, the photosensitive material is laid, for example, on the grounded holding plate 11 as shown in FIG. 10, and the surface of the photosensitive layer carrying an electroconductized pattern is charged, for example, positively by using the charger 12, and then the image of the original 13 is projected thereto as shown in FIG. 11. Then an electrostatic image divided by the electroconductive pattern is formed on the surface of the photosensitive layer. By developing this electrostatic image, a visible image 14 is formed as shown in FIG. 12.

Figure 13:
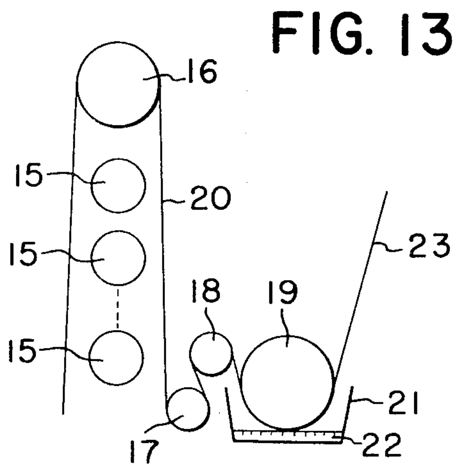
FIG. 13 shows an explanatory drawing depicting an example of method for producing the invented photosensitive material.

FIG. 13 shows an embodiment of the manufacturing process of the invented photosensitive material. Description will be given in an example given later.

Examples of organic substances used as the base of photosensitive material used in this invention are: thermoplastic resins represented by polymers or copolymers of vinyl compounds represented by vinyl chloride, propylene, vinyl acetate, styrene, acryl, and ethylene, and polycarbonate; thermosetting resins as represented by the condensation reaction products between phenol and formaldehyde, melamine and formaldehyde, urea and formaldehyde, epichlorohydrin and bisphenol, isocyanate compounds and diamine or dicarboxylic acids or polyhydric alcohols, and between polybasic acids and polyhydric alcohols; cellulose deriavtives such as cellulose acetate and nitrocellulose; natural products such as rosins, copal, rubbers, and waxes; and organic electric insulating materials represented by mixtures and derivatives of the above-mentioned substances.

Since the radiation-treated layer of this invention is colorless and transparent photosensitive materials can be composed transparent if transparent substances are used to form the base and the photoconductive layer, which enables the invented photosensitive material to be applicable to new usages where a transparent film is used such as with slide projector, microfilm projector, and overhead projector. As the transparent base, although selection can be made from among the above-mentioned organic substances, concretely, there may be polyester, polypropylene, polystyrene, polyvinyl chloride, polyvinylidene chloride, polyethylene, polycarbonate, polyacetate, moisture-proof cellophane, etc. As the photoconductive layer used in this invention there may be used a single layer of inorganic photoconductive body, a dispersion layer of inorganic photoconductive body and its binding material, a single layer of organic photoconductive body, a dissolved, fused, mixed, or suspended layer comprising organic photoconductive body and its binding material. Of course, it is possible to use the mixed system of them, for example, the mixed layer of inorganic photoconductive body and organic photoconductive body or the mixed layer of them and other additives such as binding material, sensitizing material, etc.

Examples of inorganic photoconductive body are represented by zinc oxide, titanium oxide, cadmium sulfide, selenized cadmium, selenium, and sulfur. Examples of organic photoconductive substances are: polycyclic aromatic compounds such as anthracene, crysene, pyrene, perylene, and tetracene; nitrogen containing heterocyclic compounds such as 1-methyl-2,5-bis-(4'-N,N-diethylaminophenyl-1')-1,3,4-triazole,
2,5-bis-(4'-N,N-diphenylaminophenyl-1')-1,3,4-triazole,
2,5-bis-(4'-aminophenyl-1')-1,3,4-triazole,
2,5-bis-(4'-N-ethylaminophenyl-1')-1,3,4-triazole,
1,5-diphenyl-3-methyl-pyrazoline,
1,3,5-triphenylpyrazoline,
1,3-diphenyl-5-diphenylpyrazoline,
2-(4'-aminophenyl)-5-phenyl-oxazole,
2-(4'-dimethylaminophenyl)-5-phenyloxazole,
2-(4'-dimethylaminophenyl)-4-(4'-dimethylaminophenyl)-5-phenyloxazole,
2-(4'-aminophenyl)-6-methyl-benthiazole, and
2-(4'-acetoaminophenyl)-6-methylbenzthiazole;

reaction products between polybenzalacetophenone, polyvinyl cinnalacetophenone, polyvinyl acetophenone and paradimethyl-aminocinnamaldehyde, reaction product between polyvinylacetophenone and l-naphtholadehyde, reaction product between polyvinylacetophenone and 9-anthracenealdehyde, reaction product between polyvinylacetophenone and N-ethylcarbazole-2-aldehyde, reaction product between polyvinylacetophenone and N-methylphenone azine-3-aldehyde, reaction product between polyvinylacetophenone and quinoline - 2 - aldehyde, reaction product between polyvinylacetophenone and 9-anthraaldehyde, poly - 4 - (10) - undecenylbenzofuran, polyvinylcarbazole, poly - 9 - (4 - methyl - 4 - pentenyl) carbazole, poly - N - vinylnitrocarbazole, poly - N - vinylbromcarbazole, polyvinyl malachite green (carbinol form), etc. These are made to form a layer by using coating technique, laminating technique, or vapor deposition technique. An appropriate resin is jointly used as a binder, if required during this process. Examples of binders are for example: polyvinyl chloride, polyvinylidene chloride, polystyrene, polycarbonate, copolymer of styrene and butadiene, cumaron resin, acrylic ester resin, polyvinylether, polyester, copolymer of ethylene and vinyl acetate, polyvinyl acetate, collophonium-formaldehyde resin, beccacite resin, etc.

Additives such as sensitizer may be added to these organic photoconductive bodies, if desired.

According to this invention, it is possible to provide an organic photoconductive layer directly on the surface that has undergone irradiation with radiation. It is also possible to apply a water soluble resin on the surface that has been processed by light and to provide an organic photoconductive layer thereon.

Generally speaking, these hydrophobic films, especially polyester and polyethylene films, can not be adhered to other water soluble polymers at all. However, the hydrophobic film that has been degraded by this invention has an intense adhesive property, which is not reduced with time.

Although the above-mentioned various kinds of substances may be used as the electroconductizing agent for photosensitive material, desirable representatives are water soluble and emulsion resins of copolymers of various kinds of acrylic esters and acrylic acid, copolymer of vinyl acetate and crotonic acid; water soluble copolymer resin of styrene and maleic acid; water soluble polymers of polyacrylic acid, polyvinyl alcohol, carboxymethyl cellulose, methyl and ethyl celluose, polyacryl amide, polyethylene imine gelatin, casein, and sodium alginate; water soluble quaternary ammonium polymers such as polyvinyl benzyl trimethyl ammonium salts, poly-(N,N-dimethyl-3,5-methylene) piperidium chloride, and polyvinyltrimethylammonium chloride; and water soluble polymers such as polyvinylmethylollized acrylamide (WS-120E, trade name, supplied by Soken Kagaku Co.). Moreover, the purpose of irradiating the photoconductive film in pattern form in this invention is, for example, sufficiently achieved by placing a metal mesh mask on the photoconductive film against the radiation and exposing the film to the radiation. This requires no special expensive facilities, and a uniform product can be obtained by controlling the distance from the radiation source, intensity of radiation, and time of exposure.

As the electroconductizing pattern used in this invention, a discontinuously but uniformly distributed pattern such as the mesh dot in printing or contact screen is desirable. And, if possible, the fineness of the mesh is desired to be over 100 lines/inch. However, the pattern is not limited to them.

Moreover, the irradiation can be conducted on the image forming surface of the photoconductive film or on the back surface, or on both surfaces either simultaneously or not simultaneously. The photoconductive layer which receives pattern form irradiation by radiation can be of self-supporting type or of laminated type in which the photoconductive layer is laid on the base such as paper or plastic film in advance. Furthermore, it can be of self-supporting type that is bound to the base such as paper or film after subjecting to the treatment according to this invention.

It is also possible to bind another film or photoconductive layer on the surface that has undergone discontinuous irradiation. The self-supporting single layer photoconductive film used in this invention can be produced by various known methods.

Examples are: a method in which a photoconductive composition is coated together with a solvent on a surface of glass or metal plate, dried and the resulting dried film is peeled off; a method in which the film is formed by placing a photoconductive composition in an appropriate mold; a method in which a photoconductive layer is formed in sheet form from melting state; a method in which a photoconductive composition is mixed with a solvent and the solution is pushed out in film form into a non-solvent. A still more particular example is to produce a sheet from a photoconductive fiber.

It is also possible to lay another layer, for example, an organic or inorganic insulating layer further on the photoconductive layer of the invented photosensitive material. Besides, it is of course possible to obtain a layer formation suited for applicable image forming process or usage while keeping the basic configuration of the invented photosensitive material.

This invention will be described more in detail referring to the following examples. However, these examples are given to help understanding of this invention, but, by no means to limit the scope of this invention.

EXAMPLE 1

Polyester fiber that had not undergone charge preventing treatment was exposed to an irradiation of low pressure mercury lamp (UL-2-3DQ supplied by Ushio Denki Co.) having a main wavelength of 2537 A. for 3 to 5 minutes. (Distance between the fiber and the mercury lamp was 10 to 15 cm.). The surface electric resistance was reduced to $$10^{11\sim10} \text{ ohm from } 10^{16} \text{ ohm}$$

of unexposed fiber. Moreover, the fiber that had undergone this irradiation showed an increasing adsorption of moisture and almost no dust accumulated on a surface of the fiber. In other words, antistatic effect was remarkable.

EXAMPLE 2

There are commercially available writing underlays which are made of hard vinyl chloride or polystyrene. These articles are easily charged and, the waste rubber etc. produced in erasing miswriting with a rubber eraser are made to stick to the charged underlay. When one tries to write with pencil on a piece of paper placed on the surface of the underlay, one is in trouble such as incomplete writing and breakage of paper caused by a point of pencil lead. In order to solve these troubles, the underlay was treated by the method described in Example 1. The treated underlay was scarcely charged and no sticking of dust was observed.

EXAMPLE 3

A surface of polyester film (trade name; Diafoil, manufactured by Mitsubishi Jushi Co.) 30 to 40 microns thick was subjected to photochemical reaction caused by an irradiation of a low pressure mercury lamp having a main wavelength of 1550 A. in similar manner to Example 1, the same result as that of Example 1 was obtained.

The upper surface of the treated film is coated with methylollized acrylamide copolymer (trade name; WB-120E manufactured by Soken Kagaku Co.) by using a roll, and dried for 2~3 minutes at 100° C. The resistance was further reduced to $$10^{6\sim7} \text{ ohm}$$

The obtained film was used as the packing material. Difference between this film and the untreated film was that the former had less metallic sound and was free from sticking of dust.

EXAMPLE 4

A polystyrene film (trade name; Styrex, manufactured by Mitsubishi Jushi Co.) 25~30 microns thick was subjected to photochemical reaction treatment in similar manner to Example 3. The same result as Example 2 was obtained. Further, an upper surface of the film was coated was aqueous solution of 6.0 gr. of quaternary ammonium polymer (trade name; DOW QX, manufactured by Dow Chemical Co.) and 4.0 gr. of polyethyleneglycol (polymerization degree of 2000.) The surface electric resistance was reduced further to $$10^{6\sim7} \text{ ohm}$$

This coating was very waxy and when used as the peeling paper of simple sticking method (called the Wappen-type) usually used for sign, name plate, etc., it exhibited a good peeling property and, since it was not charged at all, and dust was not sticking to it.

EXAMPLE 5

A polyester film (trade name; Diafoil manufactured by Mitsubishi Jushi Co.) 100 microns thick was subjected to photochemical reaction treatment in similar manner to Example 1, and its upper surface was coated with a mixture prepared by dissolving 10 gr. of polyvinylalcohol and 4.5 gr. of polyethylene glycol (polymerization degree of 2000) and then adding 20 gr. (40%) of aqueous solution of C.P.-261 (trade name, a quaternary ammonium polymer produced by Calgon Co.) and mixing well, to form coating. A semitransparent film was obtained.

In study of photographic technique or photoconductive member, an evaporated tin oxide depositing film called by NESA film is commonly used as a transparent electrode.

When the semitransparent film obtained by this invention was used in place of NESA film and used as a base plate for measuring photoelectric current, a very good result was obtained.

This means that the film obtained in this example was excellent in transparency and that the conductizing material layer stuck firmly to the polyester film that had undergone photochemical treatment and had a sufficiently low resistance.

On the other hand, the NESA film reduces its transparency when improving the conductivity and, moreover, the tin oxide layer was easily scratched or peeled off by rubbing. Therefore, it was found that the film obtained by this invention was far superior to the NESA film in performance.

EXAMPLE 6

A table sheet formed from natural rubber in combination with coloring matter was subjected to photochemical reaction caused by irradiation of ultraviolet rays in similar manner to Example 3. A surface of the table sheet was denatured and its surface resistance was reduced. When used as the table sheet, the irradiated sheet was less electrostatically-adhesive than vinyl underlay etc. and a good result was obtained.

EXAMPLE 7

A quartz plate was mounted on a 30W low pressure mercury lamp (trade name; UL2–3DQ, supplied by Ushio Denki Co., Ltd.) having a main wavelength of 2537 A., and upon said plate was laid a polyester film (trade name; Diafoil manufactured by Mitsubishi Jushi Co.) 100 microns thick (the distance between the film and the mercury lamp was 20~30 cm.) and the film was subjected to irradiation for 30 seconds~3 minutes. When a coating of CP–261 polymer was applied to the upper surface of the film, the surface resistance was reduced to $$10^{6\sim7} \text{ ohm}$$

(The resistance of the film was $$10^{16\sim19} \text{ ohm}$$

before irradiation.) Upon the upper surface was applied a coating of solution of brominated polyvinyl carbazole in toluene-benzene mixture. The obtained organic photoconductive film was subjected to charging and exposure according to known electrophotographic image forming method, and was developed with wet developer. An excellent image was obtained.

EXAMPLE 8

As shown in FIG. 13, 20 each of 30W low pressure mercury lamps 15 (approximately 70 cm. in length) having a main wavelength of 1850 A. were placed parallelwise at 20 cm. intervals. A polyester film 20 set on the head rotary roller 16, guide rollers 17 and 18, and coating roller 19 was moved around the mercury lamps at a speed of 2 m. per minute. The surface of the above-mentioned film was thus subjected to photochemical treatment. Next the coating liquid 22 consisting mainly of a solution of poly-4-(10)-phenyl-10-undecenylbenzofuran in the mixture of methylene chloride and dimethylformamide contained in the coating solution container 21 was applied to the photochemically treated surface of the above-mentioned film 20 continuously at a position of the coating roller 19 to form coating and the film 23 was subjected to image forming process in similar manner to Example 7. An excellent image was obtained.

EXAMPLE 9

On the surface of the film that has been exposed to irradiation in similar manner to Example 7, 5% aqueous solution of poly-(N,N-dimethyl-3,5-methylene) piperidinium chloride was applied in thin layer. A firm adhesion was obtained and the resistance was furthermore reduced to $10^5$ ohm. On its upper surface a solution of polyvinylcarbazole in toluene was applied to form coating and the film was subjected to similar treatment to Example 7. A sharp positive image was obtained.

EXAMPLE 10

A polycarbonate film was subjected to the same treatment as that of Example 7 and on its upper surface was coaed wth the organic photoconductive substance in similar manner to Example 7 followed by developing treatment. An excellent positive image was obtained.

EXAMPLE 11

The treated films produced in Examples 7, 8 and 9 were developed with dry developing agent prepared by kneading carbon black in styrene resin etc., grinding, and mixing with iron powder etc. Positive images were obtained.

EXAMPLE 12

An excellent positive image was produced when a polystyrene film was subjected to the same treatment, coating, and developing process as those of Example 7.

EXAMPLE 13

On the upper surface of the polyester film that had undergone the same treatment as that of Example 7, a solution prepared by dissolving 10 gr. of 2,5-bis-(4′-N-ethylaminophenyl-(1′))-1,3,4-triazole and 7 gr. of beccacite resin in 39 ml. of benzole, was applied to form coating, and the produced organic photoconductive film was subjected to charging and exposure according to known electrophotographic image forming method and then to development with wet developer. An excellent image was obtained.

EXAMPLE 14

10 gr. of polyvinylcarbazole was dissolved in 100 gr. of toluene. Into the solution was further dissolved 3 gr. of copolymer of ethylene and vinylacetate (trade name: Elvax–250 manufactured by Hercules Powder Co.). The solution was filtered and the filtrate was made to run out on the Teflon plate held horizontally on mercury liquid until a photosensitive material about 80~100 microns thick was formed. After almost all solvent was evaporated, the Teflon plate was dried completely in a drying oven at 60~80° C. Then the photosensitive material allowed to be peeled off from the Teflon plate.

The produced transparent film was placed on the quartz plate mounted on 30W low pressure mercury lamp (VL2–3DQ supplied by Ushio Denki Co., Ltd.) and was exposed to irradiation for 30 seconds~3 minutes, then the polymer CP–261 was applied on the upper surface of the film to a thickness of 1~2 microns (distance between the photosensitive material and the mercury lamp was 20~30 mm.). The back-surface-treated organic photoconductive film was subjected to a known electrophotographic image-forming method, in which the surface of the produced organic photoconductive photosensitive material was charged with corona discharger impressed to +7 kv. to be photosensitized. Then the film was exposed to original pattern through a lens system to form a positive electrostatic latent image. A paste was formed by well kneading together 5 gr. of carbon black, 30 gr. of alkid resin, 0.1 gr. of cobalt naphthenate, and 100 gr. of toluole in a three rollers mill. 10 gr. of this paste was dispersed in 1000 ml. of isoparaffin together with agitating to prepare a developer. An excellent transparent reversed image was formed, when the film was passed through the developer. Similarly, an excellent transparent positive image was formed, when the above-mentioned charging and exposure are repeated to the organic photoconductive photosensitive material, which was passed through a developing solution prepared by sufficiently kneading together 30 gr. of linseed oil, 5 gr. of lead chromate, and 0.5 gr. of lead naphthenate in a three rollers mill and by dispersing 6 gr. of the obtained paste in 1000 ml. of isoparaffin.

EXAMPLE 15

10 gr. of poly-4-(10)-phenyl-10-undecenylbenzofuran was dissolved in 120 gr. of methylene chloride and further 3.0 gr. of polystyrene resin was dissolved. The solution was filtered and the filtrate obtained was used for forming a film in similar manner to Example 14. The produced transparent photosensitive material was subjected to treatment and development in similar manner to Example 14. An excellent positive image was obtained.

EXAMPLE 16

10 gr. of polyvinylbromocarbazol was dissolved in 100 gr. of toluene, and 30 gr. of styrene-butadiene copolymer resin was further dissolved in the solution. A photosensitive material was produced by performing the same manner as Example 14. On a back surface of the organic photoconductive photosensitive material was effected to the same photochemical reaction as described in Example 14, and further on the upper surface of the said material was applied a thin coating of low resistance treating agent; poly(N,N-dimethyl - 3,5 - methylene) piperidinium chloride, and then dried. An excellent positive image was obtained when the produced photosensitive material was subjected to charging, exposure, and development in similar manners to Example 14.

EXAMPLE 17

5 gr. of the organic photoconductive substance prepared in same manner as Example 14 and 5 gr. of organic photoconductive substance prepared in same manner as Example 16 were dissolved in 100 gr. of toluene and a photosensitive material was formed in similar manner to Example 14.

Further, a back surface of the photosensitive material was conductized by said photochemical reaction and the material was subjected to charging, exposure, and development in similar manners to Example 14. An excellent positive image was obtained.

EXAMPLE 18

10 gr. of poly-9-(4-methyl-4-pentenyl)carbazole was dissolved in the mixture of 50 gr. of toluene and 65 gr. of methylene chloride and 3.0 g. of vinylidene polychloride was further dissolved in the above-mentioned solution. 0.05 gr. of trinitrofluolenone as a sensitizer was added to the solution, and the final solution was treated in similar manner to Example 14 to produce a photosensitive material. The obtained photosensitive material was subjected to photochemical reaction to have conductivity and further subjected to charging, exposure, and development in similar manners to Example 14. An excellent positive image was obtained.

EXAMPLE 19

The organic photoconductive photosensitive material obtained in Example 18 was subjected to charging and exposure, then developed with a dry developer prepared by kneading together and grinding carbon black and styrene resin and mixing with iron powder etc. An excellent positive image was obtained.

EXAMPLE 20

To 50 gr. of zinc oxide (trade name; Suzex–1000 manufactured by the Sakai Kagaku Co.) was added 25 gr. of styrene-butadiene (40:60 in mol ratio) copolymer resin dissolved in 50 gr. of toluene, and mixed. The mixture was subjected to dispersion for 5–6 hours by employing ball mill dispersion method. Then to this pigment dispersed resin solution was added 0.082 ml. of 0.5% solution of Rose bengale in methyl alcohol, and agitated sufficiently. Then the solution was applied to form coating on the glass plate to which mold releasing silicone resin had been baked for releasing the formed film, and then dried. The photoconductive released film thus obtained had a smooth and lustrous surface on the side that had been in contact with the glass surface. The back surface of the film was conductized through photochemical reaction similar to Example 14. Next, the surface was charged with the corona discharger impressed with −7 kv. to increase photosensitivity and an electrostatic latent image was formed on it by exposure of original pattern through lens system. Next, the latent image was developed with carbon black type liquid developer described in Example 14. The negative latent image attracted positive developing substance and was converted into black positive image. This image formed copy is used for the original of reflection projection because it has a smooth surface.

EXAMPLE 21

10 gr. of anthracene and 6 gr. of polycarbonate were dissolved in 40 ml. of methylene chloride and the solution was applied to form coating on the polyester film that has undergone photochemical reaction or on the film layer that had undergone photochemical reaction and had been coated with low resistant treating agent in an amount 6∼7 gr. (dry weight) per 1 square meter to produce a photoconductive film. This film was subjected to charging, exposure, and development in similar manner to Example 14. An excellent positive image was obtained.

EXAMPLE 22

10 gr. of 1-methyl-2,5-bis-(4′-N,N-diethylaminophenyl-(1′))-1,3,4-triazole and 7 gr. of collophoniumformaldehyde resin were dissolved in 38 ml. of benzole, and a photoconductive film was produced in similar manner to Example 21. This film was subjected to charging, exposure, and development in similar manner to Example 14, and an excellent positive image was obtained.

EXAMPLE 23

10 gr. of poly-N-vinylcarbazole was dissolved in 100 gr. of toluene and further 3.0 gr. of polyester resin (trade name; Vitel manufactured by the Du Pont Co.) was further dissolved. The solution was made to flow on the Teflon plate held horizontally on mercury liquid to form a film about 80∼100 microns thick. When almost all solvent has evaporated, film was dried completely in the oven at 60∼80° C. Then the film was peeled off the Teflon plate (refer to FIG. 7). On the surface of the obtained transparent film a screen metal network of 400 mesh was placed and, the upper surface is exposed to irradiation for 30 seconds to 3 minutes of a low pressure mercury lamp (trade name; UL–2–3DQ supplied by Ushio Denki Co.) having a main wavelength of 2537 A. (the distance between the film and the low pressure mercury lamp was 10∼15 mm.) as described in detail in this specification to cause photochemical reaction. The surface electric resistance at irradiated portion was reduced to $10^8$ ohm. The unirradiated portion still had a resistance of $10^{14}$ ohm. Refer to FIGS. 8 and 9 for these photochemical reaction and electric resistance pattern. Next, this film was subjected to known electrophotographic image forming method.

The surface having a photoconductive pattern was charged by a corona discharger impressed with +7 kv. to be made photosensitive. Then an original pattern is made to contact with the surface, and which was exposed to irradiation. Then the charged pattern was obtained as shown in FIG. 10. By effecting photochemical reaction on the photoconductive layer discontinuously as above, the edge effect which was easily produced in conventional methods was not carried out at all and, in addition, a photographic image was obtained in a continuous gradation. When the film was passed through the developing solution prepared by dispersing 6 gr. of paste which was formed by well kneading together 30 gr. of linseed oil, 5 gr. of lead chromate, and 0.5 gr. of lead naphthenate in three rollers mill, in 1000 ml. of isoparaffin solvent, an excellent positive image of continuous gradation was obtained on the photosensitive material. Refer to FIG. 12.

EXAMPLE 24

A back surface of the photoconductive photosensitive material obtained in Example 23, which had an electric resistance pattern was subjected to irradiation of a low pressure mercury lamp (trade name; UL-2-3DQ supplied by the Ushio Denki Co.) for 30 seconds to 3 minutes (the distance between the film and the low pressure mercury lamp was 10~15 cm.) to be made conductive.

Then the film was subjected to charging, exposure, and (without being placed on the metal plate) development similar to Example 23, an excellent photographic positive image having a continuous gradation was obtained similar to Example 23.

EXAMPLE 25

To 50 gr. of zinc oxide (trade name; Suzex manufactured by Sakai Kagaku Co.) was added 90 gr. of 20% (in dry weight) solution of ethylene-vinyl acetate copolymer resin (trade name; Elvax manufactured by Hercules Powder Co.) in toluene and the mixture was dispersed for 5 hours by employing a ball mill dispersion method. Further, 10 gr. of methyl alcohol solution of Rose bengale (0.5% in dry weight) was added, agitated well, then the film was produced in similar manner to Example 23. Next, an electric resistance pattern was formed on the surface in similar manner to Example 23 and its upper surface was charged with a corona discharger impressed with −7 kv. to be made photosensitive. Then, the exposure was conducted.

When the film was passed through the developing solution prepared by dispersing 10 gr. of paste which was formed by kneading together 5 gr. of carbon black 30 gr. of alkyd resin, 0.1 gr. of cobalt naphthenate, and 100 gr. of toluole in a three rollers mill, in 1000 ml. of mineral spirit solvent. An excellent photographic positive image was obtained in a continuous gradation.

EXAMPLE 26

On a surface of photosensitive layer of commercially available duplicating paper coated with zinc oxide for electrophotography was formed an electric resistance pattern by using photochemical reaction in similar manner to Example 23 and the paper was subjected to charging, exposure, and development similar manner to Example 25. An excellent photographic positive image was obtained in a continuous gradation.

EXAMPLE 27

10 gr. of 2-(4′-aminophenyl)-5-phenyl oxazole and 7 gr. of keton resin were dissolved in 35 ml. of benzole, and the solution was applied to form coating on polyester film that had undergone photochemical reaction, or on the film layer having the upper surface that has undergone photochemical reaction and was coated with electroconductizing agent, at an amount of 6~7 gr. (in dry weight) per square meter to form a photoconductive film. The film on which a screen metal network of 400 mesh was placed was subjected to charging, exposure, and development in similar manner to Example 23. An excellent positive image was obtained in a continuous gradation.

EXAMPLE 28

10 gr. of polyvinylcarbazole was dissolved in 100 gr. of toluene, and further 8.0 gr. of styrene-butadiene copolymer resin was dissolved in the solution. The obtained solution was applied to form coating in an amount of 12~16 gr. per square meter in similar manner to Example 27 on the same film, to form an organic photoconductive film. The film on which a screen network had been placed was subjected to charging, exposure, and development in similar manner to Example 23. An excellent positive image was obtained in a continuous gradation.

What is claimed is:

1. A process for preparing a photosensitive member for electrophotography which comprise applying for a period of about 30 seconds to about 3 minutes radiation predominantly composed of wavelengths of 1850–2357 A. to a support film selected from the group consisting of polystyrene, polypropylene, polyethylene terephthalate, polyvinyl chloride, polyvinylidene chloride, polyethylene, polycarbonate, polyacetate, and moisture-proof cellophane to cause a chemical change thereby increasing the hydrophilic property of said support film; coating a polymer of a quaternary ammonium salt on the surface of said support film to which the radiation has been applied to form a conductive layer, and providing a photoconductive layer on the resulting conductive layer.

2. A process according to claim 1 in which the polymer of a quaternary ammonium salt is a member selected from the group of poly(N,N-dimethyl-3,5-methylene)piperidinium chloride and polyvinylbenzyltrimethyl ammonium chloride.

3. A process according to claim 1 in which the photoconductive layer is predominantly composed of organic photoconductive material.

References Cited

UNITED STATES PATENTS

| | | | |
|---|---|---|---|
| 3,561,957 | 2/1971 | Perry | 96—1 |
| 3,285,740 | 11/1966 | Weigl et al. | 96—1 |
| 3,081,165 | 3/1963 | Ebert | 96—1 |
| 3,159,483 | 12/1964 | Behmenberg et al. | 96—1 |
| 3,519,422 | 7/1970 | Gaynor et al. | 96—27 |

JOHN C. COOPER III, Primary Examiner

U.S. Cl. X.R.

204—159.14; 117—93.3, 93.31, 47